(12) United States Patent
Field

(10) Patent No.: US 11,173,437 B2
(45) Date of Patent: Nov. 16, 2021

(54) MODULAR FILTRATION SYSTEM AND METHOD

(71) Applicant: Casey William Field, Colorado Springs, CO (US)

(72) Inventor: Casey William Field, Colorado Springs, CO (US)

(*) Notice: Subject to any disclaimer, the term of this patent is extended or adjusted under 35 U.S.C. 154(b) by 0 days.

(21) Appl. No.: 17/151,513

(22) Filed: Jan. 18, 2021

(65) Prior Publication Data

US 2021/0138375 A1  May 13, 2021

Related U.S. Application Data

(63) Continuation-in-part of application No. 16/793,426, filed on Feb. 18, 2020, now abandoned.

(Continued)

(51) Int. Cl.
*B01D 15/22* (2006.01)
*B01D 24/00* (2006.01)
(Continued)

(52) U.S. Cl.
CPC ............ *B01D 35/303* (2013.01); *A23D 9/04* (2013.01); *A23L 5/20* (2016.08); *A23L 5/40* (2016.08);
(Continued)

(58) Field of Classification Search
CPC .. B01D 25/02; B01D 29/0018; B01D 24/007; B01D 46/543; B01D 25/002; B01D 63/082; B01D 29/085; B01D 24/22; B01D 35/34; B01D 2313/02; B01D 2313/54; B01D 23/18; B01D 29/0004; B01D 29/01; B01D 29/0095; B01D 29/0027; B01D 29/0052; B01D 24/12; B01D 39/083; B01D 39/1615; B01D 39/086; B01D 39/1623; B01D 71/74; B01D 2201/342; B01D 2201/34; B01D 71/24; B01D 2201/305; B01D 71/08; B01D 2201/304; B01D 23/10; B01D 29/0029; B01D 35/02; B01D 2253/11; B01D 15/265; B01D 46/10; B01D 2313/20; B01D 39/1692; B01D 27/08; B01D 27/02; B01D 29/56; B01D 2313/04;
(Continued)

(56) References Cited

U.S. PATENT DOCUMENTS 1,362,998 A     12/1920  Lindemann
2,000,137 A  *   5/1935  Kelley ................... B01D 35/18
                                                          210/777

(Continued)

*Primary Examiner* — Lucas A Stelling
*Assistant Examiner* — Angel Olivera
(74) *Attorney, Agent, or Firm* — Martensen IP; Barbara B. Courtney; Michael C. Martensen

(57) ABSTRACT

A system for further filtering a liquid extract material after an initial extraction process. In an embodiment, the system includes a semi-rigid filter cup that is substantially cylindrical, the filter cup having a top and a bottom, wherein the top is oriented to receive filter media prior to a filtration process, and material to be filtered during the filtration process. The filter cup includes an integrated deformable flange at the top of the filter cup, an integrated top o-ring that is integrated into the top of the integrated deformable flange and an integrated bottom o-ring that is integrated into the bottom of the integrated deformable flange.

12 Claims, 9 Drawing Sheets

Related U.S. Application Data

(60) Provisional application No. 62/875,711, filed on Jul. 18, 2019.

(51) Int. Cl.

| | |
|---|---|
| B01D 24/12 | (2006.01) |
| B01D 27/02 | (2006.01) |
| B01D 27/08 | (2006.01) |
| B01D 29/00 | (2006.01) |
| B01D 29/05 | (2006.01) |
| B01D 29/11 | (2006.01) |
| B01D 35/30 | (2006.01) |
| F16L 23/22 | (2006.01) |
| F16L 23/026 | (2006.01) |
| F16L 19/025 | (2006.01) |
| F16L 19/02 | (2006.01) |
| F16L 17/067 | (2006.01) |
| F16L 17/06 | (2006.01) |
| A23D 9/04 | (2006.01) |
| A23L 5/20 | (2016.01) |
| A23L 5/40 | (2016.01) |
| B01D 29/56 | (2006.01) |
| F16L 19/028 | (2006.01) |
| C11B 3/00 | (2006.01) |
| B01D 39/06 | (2006.01) |
| A23D 9/00 | (2006.01) |
| A23D 9/02 | (2006.01) |
| A23L 2/72 | (2006.01) |
| B01D 15/26 | (2006.01) |
| B01D 24/04 | (2006.01) |
| B01D 27/04 | (2006.01) |
| B01D 35/02 | (2006.01) |
| C02F 103/32 | (2006.01) |
| B01D 46/10 | (2006.01) |
| B01D 39/16 | (2006.01) |

(52) U.S. Cl.
CPC ............ *B01D 15/22* (2013.01); *B01D 24/12* (2013.01); *B01D 27/02* (2013.01); *B01D 27/08* (2013.01); *B01D 29/0029* (2013.01); *B01D 29/05* (2013.01); *B01D 29/56* (2013.01); *B01D 35/308* (2013.01); *B01D 39/06* (2013.01); *C11B 3/008* (2013.01); *F16L 19/02* (2013.01); *F16L 19/025* (2013.01); *F16L 19/0206* (2013.01); *F16L 19/0286* (2013.01); *F16L 23/026* (2013.01); *A23D 9/00* (2013.01); *A23D 9/02* (2013.01); *A23L 2/72* (2013.01); *A23V 2002/00* (2013.01); *B01D 15/265* (2013.01); *B01D 24/001* (2013.01); *B01D 24/04* (2013.01); *B01D 27/04* (2013.01); *B01D 29/11* (2013.01); *B01D 35/02* (2013.01); *B01D 39/1692* (2013.01); *B01D 46/10* (2013.01); *B01D 2201/0415* (2013.01); *B01D 2201/0469* (2013.01); *B01D 2201/202* (2013.01); *B01D 2201/301* (2013.01); *B01D 2201/304* (2013.01); *B01D 2201/305* (2013.01); *B01D 2201/307* (2013.01); *B01D 2201/342* (2013.01); *B01D 2201/347* (2013.01); *B01D 2253/11* (2013.01); *B01D 2313/04* (2013.01); *B01D 2313/20* (2013.01); *C02F 2103/322* (2013.01); *C02F 2201/004* (2013.01); *C02F 2201/006* (2013.01); *C02F 2201/007* (2013.01); *F16L 17/06* (2013.01); *F16L 17/067* (2013.01); *F16L 19/0218* (2013.01); *F16L 23/22* (2013.01); *Y10T 137/9029* (2015.04); *Y10T 292/481* (2015.04)

(58) Field of Classification Search
CPC ...... B01D 2201/0415; B01D 2201/301; B01D 2201/347; B01D 2201/0469; B01D 29/11; B01D 63/087; B01D 69/12; B01D 35/303; B01D 29/05; B01D 35/308; B01D 39/06; B01D 24/04; B01D 24/001; B01D 2201/202; B01D 2201/307; B01D 27/04; F16L 23/026; F16L 19/0206; F16L 19/02; F16L 19/0286; F16L 19/025; F16L 17/06; F16L 17/067; F16L 19/0218; F16L 23/22; C02F 2201/007; C02F 2201/006; C02F 2201/004; C02F 2103/322; C11B 3/008; Y10T 137/9029; Y10T 292/481; A23D 9/02; A23D 9/00; A23D 9/04; A23L 2/72; A23L 5/20; A23L 5/40; A23V 2002/00

See application file for complete search history.

(56) References Cited

U.S. PATENT DOCUMENTS

| | | | |
|---|---|---|---|
| 6,187,209 B1 | 2/2001 | Shurtliff et al. | |
| 2003/0037675 A1 | 2/2003 | Gillingham et al. | |
| 2005/0108867 A1* | 5/2005 | Winter | B29C 45/4407 29/525 |

* cited by examiner

12
MODULAR FILTRATION SYSTEM AND METHOD

RELATED APPLICATION

The present application is a continuation-in-part of U.S. patent application Ser. No. 16/793,426, filed 18 Feb. 2020, which relates to and claims the benefit of priority to U.S. Provisional Patent Application No. 62/875,711 filed 18 Jul. 2019, both of which are hereby incorporated by reference in its entirety for all purposes as if fully set forth herein.

BACKGROUND OF THE INVENTION

Field of the Invention

Embodiments of the present invention relate, in general, to filtration systems and methods and more particularly to configurable, pressurized filtration systems as

Background

Color remediation filters are an example of an enhanced extraction/filtration processes in the food industry. For example, in the production of olive oil (or other plant extracts) the source plant material (olives) is subjected to an initial extraction process to yield the "raw" extract—olive oil. The raw olive oil is then further filtered to remove leftover undesirable substances from the initial extract product of the extraction process that give the initial extract product a dark color and an undesirable taste. This second filtration process is sometimes referred to as color remediation.

FIG. 1 is an exploded view of components of prior art color remediation filter system 100. System 100 is placed in a pressurized production line handling the plant extract in order to further filter the plant extract. Reducers 102 are known in the art, are typically formed from stainless steel, and include tri-clamp flanges 103 at top and bottom. Tri-clamp flanges 103 are of different sizes in order to reduce or expand the diameter of the of the flow line. This is illustrated by the relative orientations of reducer 102 at the top of the figure and reducer 102 at the bottom of the figure. In this figure, the plant extract flow is from top to bottom of the figure. The reducer 102 at the top accommodates expansion of the diameter of the flow line, while reducer 102 at the bottom accommodates reduction of the diameter of the flow line.

Tri-clamps 104 are known in the art and serve to securely join components via mating tri-clamp flanges in a pressurized environment.

Rubber gasket 106 is formed to mate with tri-clamp flanges 103 on both upper and lower sides and serves to further conserve pressurization of the filtration environment.

Spool 108 is a cylindrical component, typically formed from stainless steel, that is used to contain filter media through which the liquid plant extract and extract solvents (such as butane, Propane, Heptane, Hexane, Pentane, Isopropyl, and Ethanol) are forced after being introduced through the top reducer 102. Filter media can include one or a more materials in powder form, such as bentonite clay, silica gel, and synthetic magnesium. The particle size of the filter media is typically in the range of 2-5 micron. The bottom of spool 108 is open and the filter media is poured in after attachment of filter container 110 to spool 108 using rubber gasket 106 and a tri-clamp 104 (not shown here for clarity).

Filter container 110 is typically formed from stainless steel and houses a paper filter 112 retained by a retainer ring 114, as shown in greater detail in FIG. 2.

After the liquid plant extract and the extract solvent have been forced through the top reducer 102, the spool 108 containing the filter media, and the paper filter housed in the filter container 110, the resultant liquid material exits the system 100 through the bottom reducer 102.

FIG. 2 is a diagram of the prior art filter container 110. This shows in greater detail the filter paper 112 and the retainer ring 114 that must be inserted into the filter container 110 for each filtration cycle.

FIG. 3 is diagram of the prior art reducer 102 and rubber gasket 106 components. Each reducer 102 component includes a tri-clamp flange 103. Each tri-clamp flange 103 is formed with a receiving channel 105 to mate with an o-ring portion 107 of the rubber gasket 106.

There are several disadvantages to the prior art color remediation systems. The spool 108 requires cleaning and refilling after each filtration cycle. The filter container 110 requires removal and cleaning. In addition to labor time consumed in this cleaning and re-filling process, there are significant negative health and environmental effects due to leakage.

The filter paper 112 in some systems is some system is replaced by sintered stainless steel or nylon. Paper filters and nylon filters are replaceable, but allow bypass of the filter media into the final consumable product when the filter media collects on the filter and seeps around the top of the filter. Sintered stainless steel filters are used as well, but it is virtually impossible to clean all the media powders out of sintered stainless steel filters after continuous use. Sintered stainless steel filters also allow bypass of the filter media into the final consumable product.

The overall result is that some amount of powder media leaks around the outside edges of the filter paper (because it is not a true seal) and into the final product. In addition, because the particle size of the filter media is so small on the (2-5 micron), much of it becomes airborne during the refilling process and even during the filtration process. Overfilling spool 108 with the filtration media can force some impurities to go through the filtration levels and end up in the final product, which can be detrimental to human health. Inexperienced operators can improperly stack and pack the components, which can risk contaminating the final product with any of the filtration media. Filtration media can be very harmful if inhaled, and also add to pollutants in the environment.

Considering that the packing of filter spools 108 with the powder filter media is often done in the same environment in which the extraction and filtration processes take place, there is a likelihood that the process environment becomes increasingly contaminated with filter media particles over time, as does the finished extraction product as well.

It would be desirable to provide a filtration system and method that is modular, compatible with current color remediation systems, and alleviates health, environment, and efficiency concerns while producing the desired filtered consumable product.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention include a system and method for more safe and efficient color remediation. For example, the embodiments disclosed illustrate a system and method for reducing the escape of harmful particulate matter into the workplace and the environment, and the final product during a process of filtration of human consumables. Color filtration is a process that is used as an example here, but the invention is not so limited.

Figure 4:
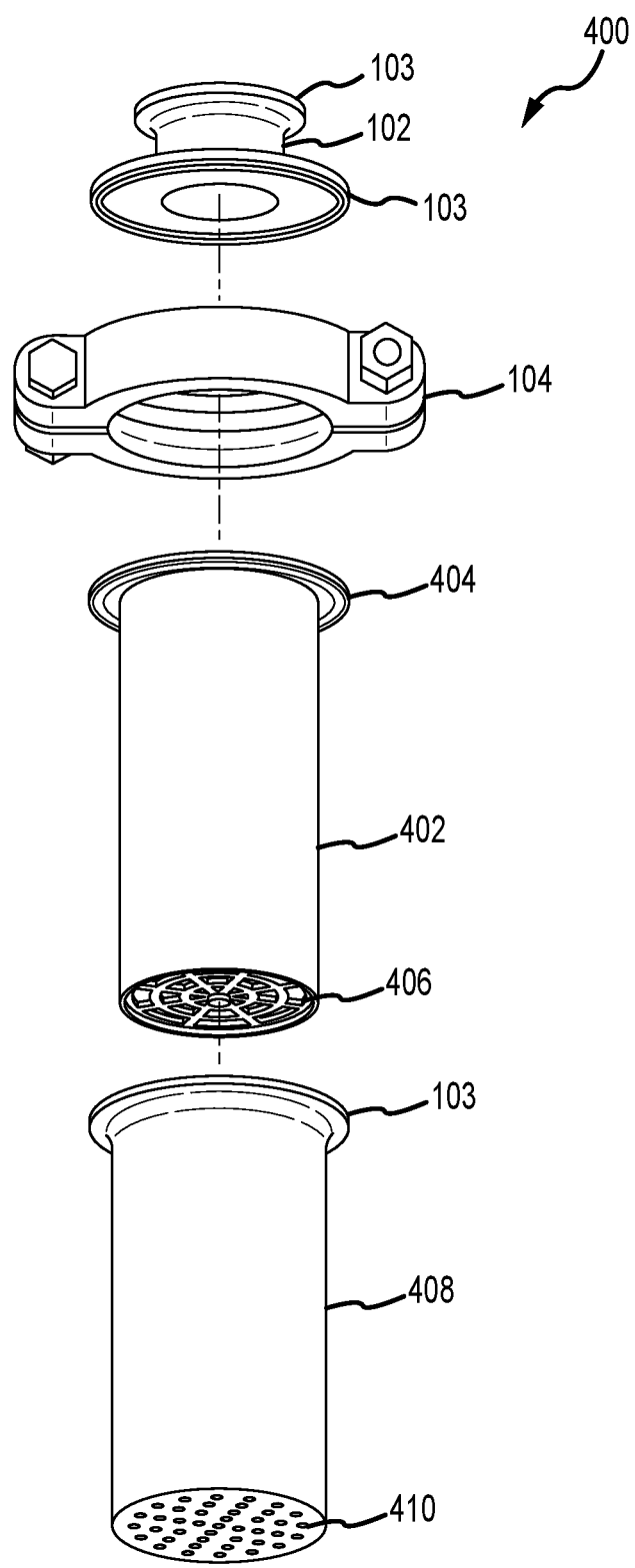
FIG. 4 is an exploded view of a modular filtration system according to an embodiment.

FIG. 4 is an exploded view of a modular filtration system according to an embodiment. The flow of material is from top to bottom in this figure and in all of the subsequent figures. Material includes liquid plant extract and extract solvent introduced into the top of reducer 102. Extract solvents include butane, Propane, Heptane, Hexane, Pentane, Isopropyl, and Ethanol, but embodiments are not so limited. Tri-clamp 104 is a known component in such systems. In this embodiment, tri-clamp 104 serves to secure integrated deformable flange 404 between reducer 102 and flange 103 sufficiently to withstand the pressures of the filtration process. Deformable flange 404 is differentiated from flange 103 in that flange 103 is completely rigid. To mate flange 103 with another flange 103 requires an intermediary, deformable component such as a rubber gasket 106 in order to provide a pressure-tolerant seal between components in a pressurized filtration system. The deformable flange 404, with its integrated o-rings 602 (refer to FIG. 6)*is* all that is required to make this secure seal, without the requirement of a rubber gasket 106. Filter cup 402 is a substantially cylindrical, disposable semi-rigid filter cup compatible with various filtration systems. In various embodiments, filter cup 402 different dimensions. For example, the height of filter cup 402 can range from approximately 5 inches to approximately 6 inches. The inner diameter of filter cup 402 can range from 2.25 inches to 3.75 inches. All of these dimensions are examples only, are not limiting.

Filter cup 402 in an embodiment is plastic injection molded and composed of Poly Propylene. In other embodiments, filter cup 402 can be made from a vast number of plastic composites. Poly Propylene has the advantages of being relatively inexpensive and having the chemical compatibility to be used with all the solvents typically used during the extraction process.

Filter cup 402 is typically offered to system users prefilled with filter media in one embodiment and includes a peel-off plastic lid (not shown) so that the user can easily insert the filter cup prefilled with media into the filtration stream after removing the lid. This allows for minimum exposure to the filter media due to spillage caused by manual refill of reusable components. In addition, no clean-up of reusable components, such as the spool 108 or filter container 110 (which is eliminated in the invention) is required. Alternatively, Filter cup 402 can be provided to system users as an empty cup that the system user can fill with their own filter media.

Filter cup 402 also includes a deformable flange 404 with o-ring 602 (as later shown in FIG. 6). All plastic molded components of filter cup 402 in all figures are understood to include deformable flange 404, integrated o-ring 602 (as later shown), and 702 gridded floor (as later shown).

Filter cup 402 further includes an integrated filter layer 406. The integrated filter layer 406 can be any type of filter material that is relatively thin with respect to the wall dimensions of the filter cup 402. In one embodiment, filter layer 406 is a paper filter, and the element 406 will be referred to as paper filter 406 herein, but the invention is not so limited. Any other suitable materials could be used to form filter layer 406. Paper filter 406 is integrated during the injection molding process that results in the filter cup 402.

Filter cup 402 is disposable and is intended to be disposed of after the filtration process, regardless of whether the user opts to use a pre-filled filter cup 402 with a removeable lid (not shown) or to fill an empty filter cup 402 with filter media before the filtration process. This eliminates clean-up after a filtration cycle and significantly reduces the opportunity for filter media to enter the final filtration product or the environment.

Figure 5:
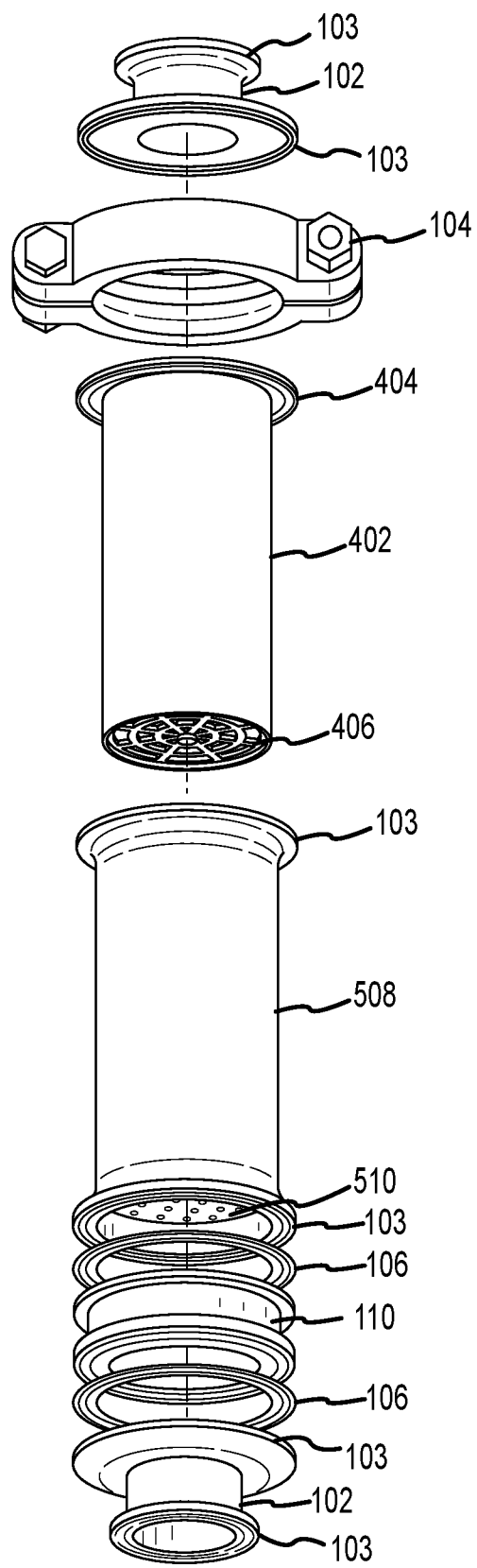
FIG. 5 is an exploded view of a modular filtration system according to an embodiment.

Spool 408 is one embodiment of the system that can be chosen to extract the final filtration product without further filtration, sometimes referred to as a "blast" system. Spool 408 is a stainless steel spool that includes a tri-clamp flange 103. Trip-clamp flange 103 is typically also made of stainless steel and welded to spool 408 to yield a unified stainless steel body. At the bottom of spool 408 is a flat perforated bottom 410. Flat perforated bottom 410 is typically also made of stainless steel and welded to spool 408 to yield a unified stainless steel body FIG. 5 is an exploded view of a modular filtration system according to an embodiment. In this embodiment, it is possible for a user to add an additional level of filtration (as opposed to the "blast system" of FIG. 4) if desired.

Figure 1:
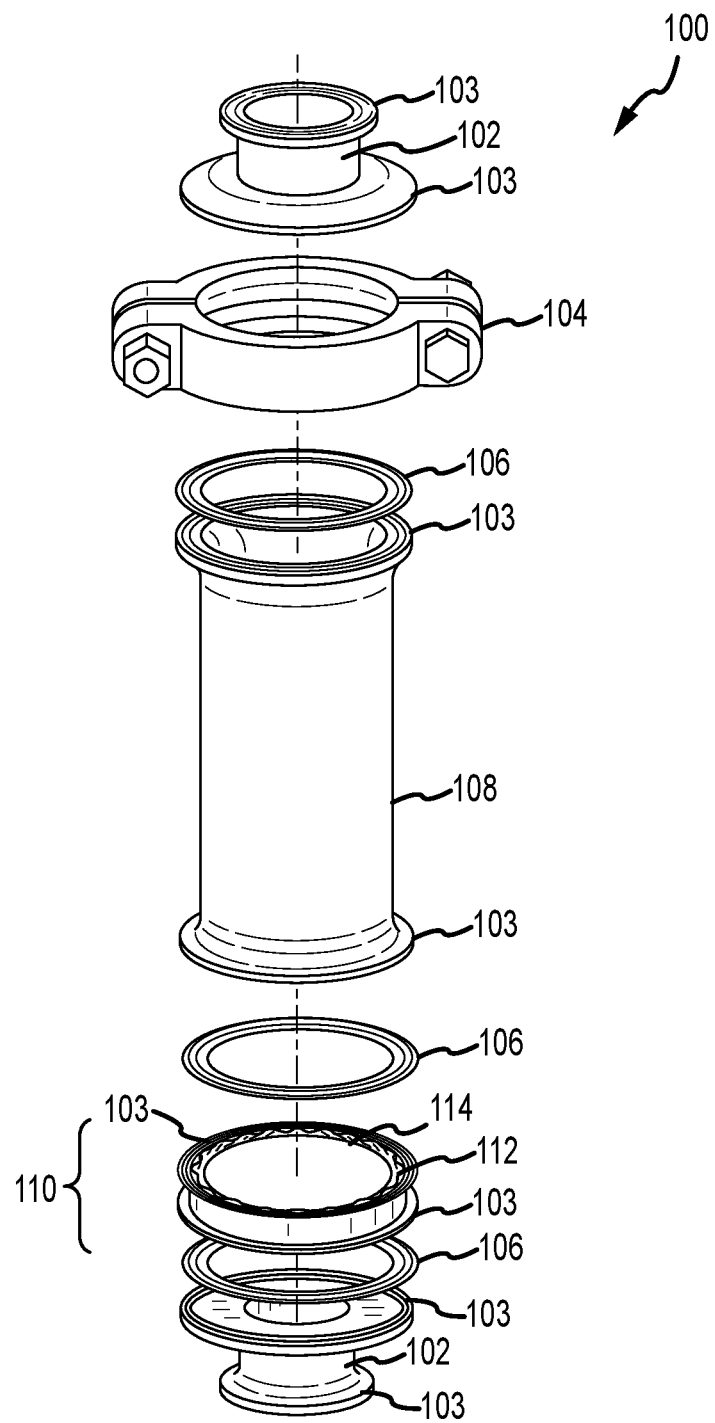
FIG. 1 is an exploded view of components of prior art color remediation filter system.
Figure 2:
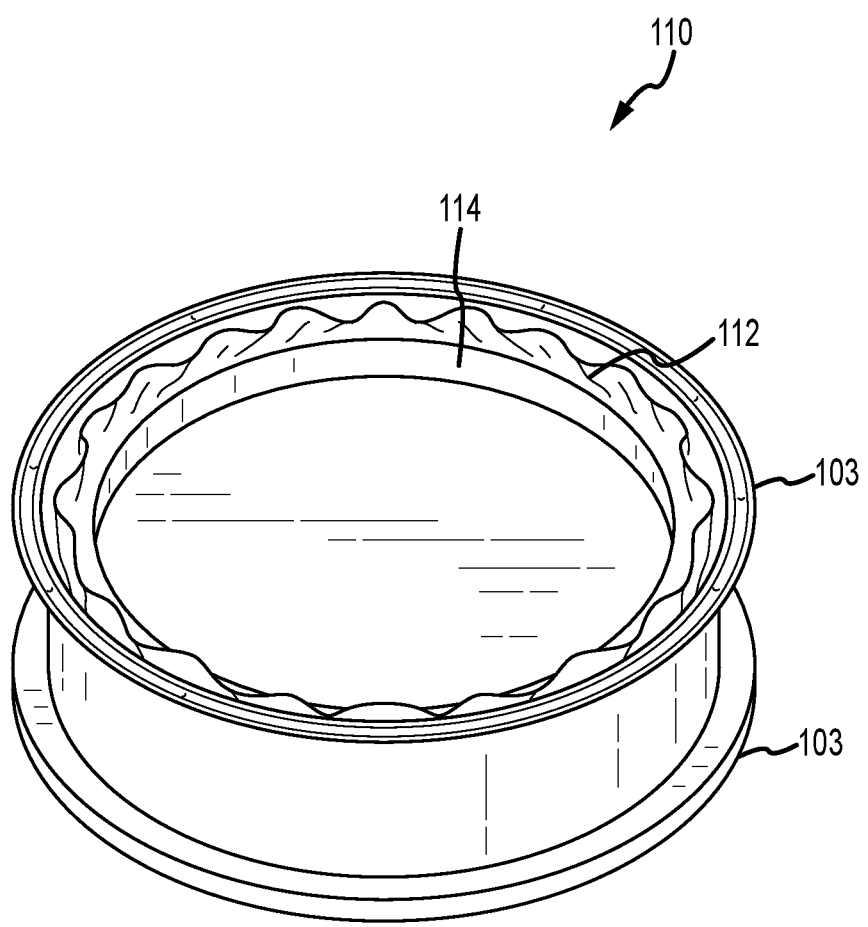
FIG. 2 a diagram of a prior art filter container.
Figure 3:
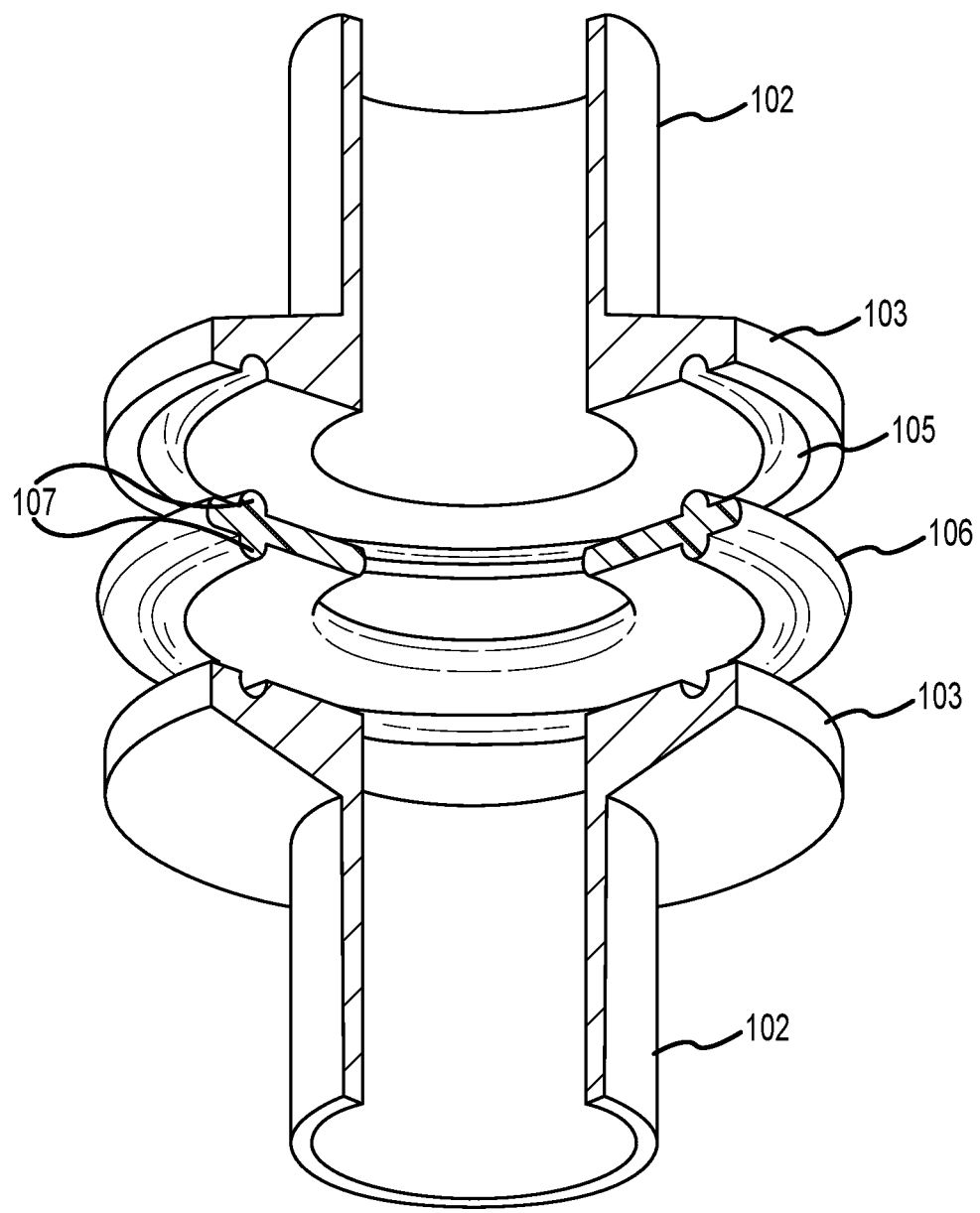
FIG. 3 is a diagram of a prior art reducer and rubber gasket.

Starting from the top of FIG. 5, the filtration components enter the system just as described with reference to FIG. 4. The difference in the embodiments of FIG. 4 and FIG. 5 is that the spool 508 is configured to accommodate additional filtration components. Spool 508 includes a tri-clamp flange 103 at the top and a tri-clamp flange 103 at the bottom. Spool 508 also includes perforations 510 at its bottom. If desired, any additional filtration components can be introduced into the flow between lower rubber gasket 106 and lower reducer 102. As shown here by way of example, a filter container 110 (as in FIG. 1). A tri-clamp 104 is used (but not shown for clarity) to secure the bottom of component 508 to the top of filter container 110, with a rubber gasket 106 in between. Another tri-clamp flange 104 (not shown for clarity) is used to secure the bottom of the filter container 110 to the top of the lower reducer 102, with a rubber gasket 106 in between. Any component other than filter container 110 can be added to follow component 508 in the product flow. Filter container 110 is included here merely as an example.

Figure 6:
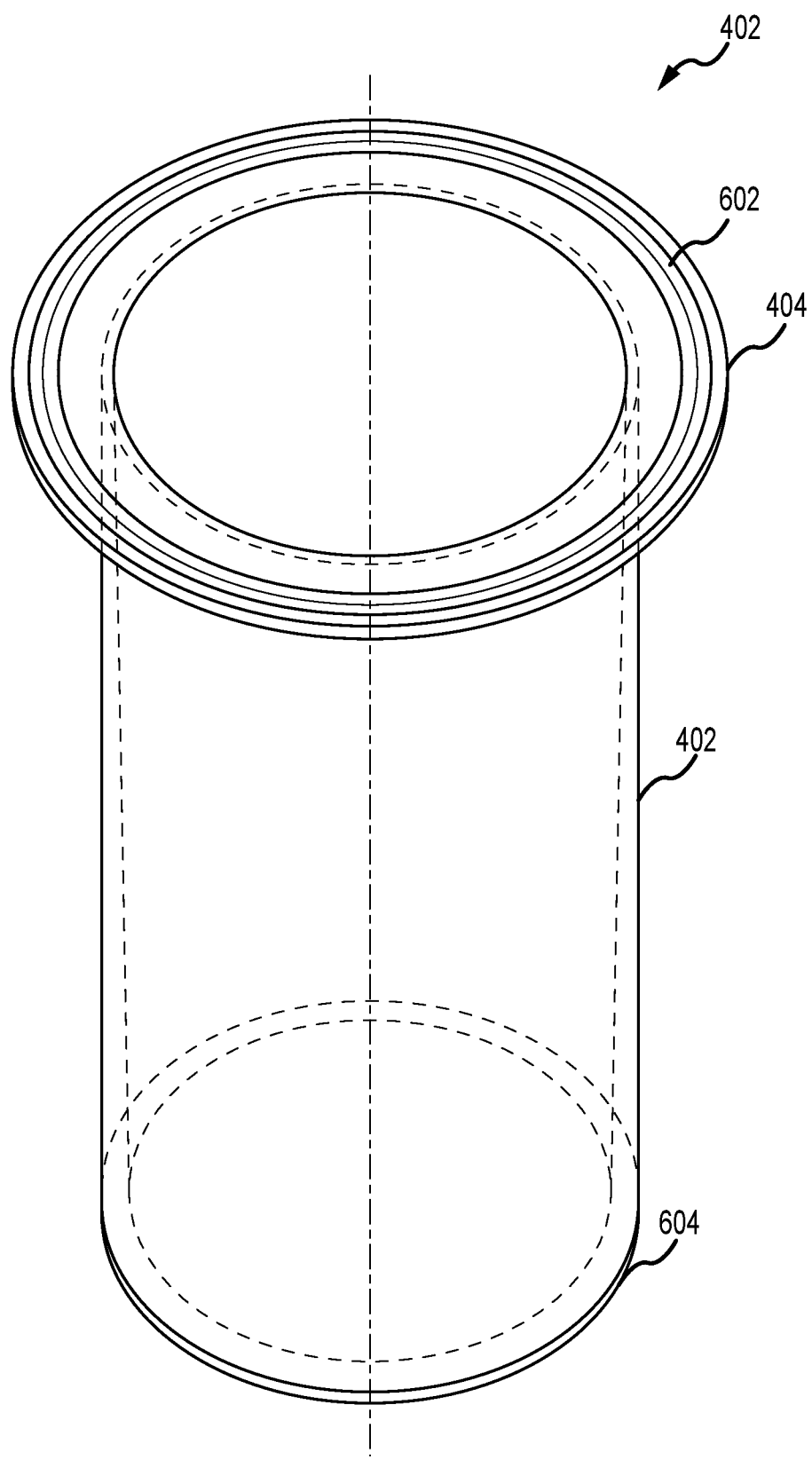
FIG. 6 is a diagram of a filter cup according to an embodiment.

FIG. 6 is a diagram of a filter cup 402 according to an embodiment. In this figure, the body of filter cup 402 is shown without a lid. Deformable flange 404 is molded with the body of filter cup 404. Deformable flange 404 includes an integrated top and bottom o-rings 602 (only the top o-ring is shown here) configured to mate with any flange 103 on either side of the flow. The bottom 604 of filter cup 402 is further illustrated in FIGS. 7A and 7B.

Figure 7A:
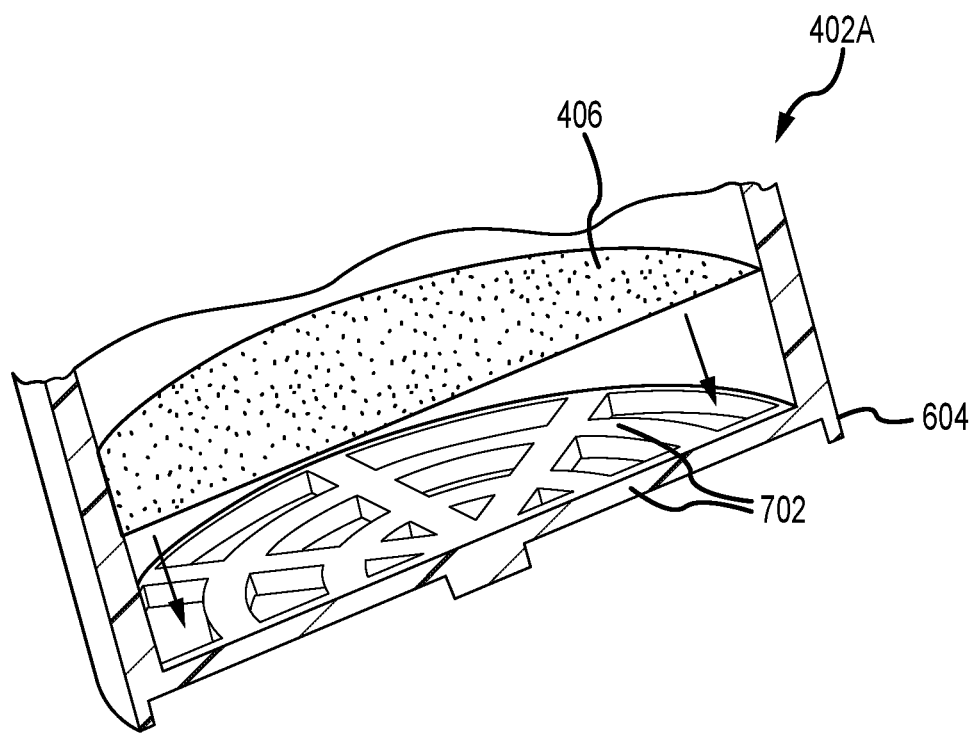
FIG. 7A is a diagram of the bottom of a filter cup and an integrated paper filter before integration according to an embodiment.

FIG. 7A is a diagram of the bottom 604 of a filter cup 402A and an integrated paper filter 406 before integration according to an embodiment. In FIG. 7A, filter paper 406 is shown before integration during the plastic molding process. for purposes of illustration and understanding. Also shown is the gridded floor 702 of 402A. Filter cup 402, after the molding process, includes the gridded floor 702, the integrated paper filter 406, and the deformable flange 404 with integrated o-rings 602 as one unified body.

Figure 7B:
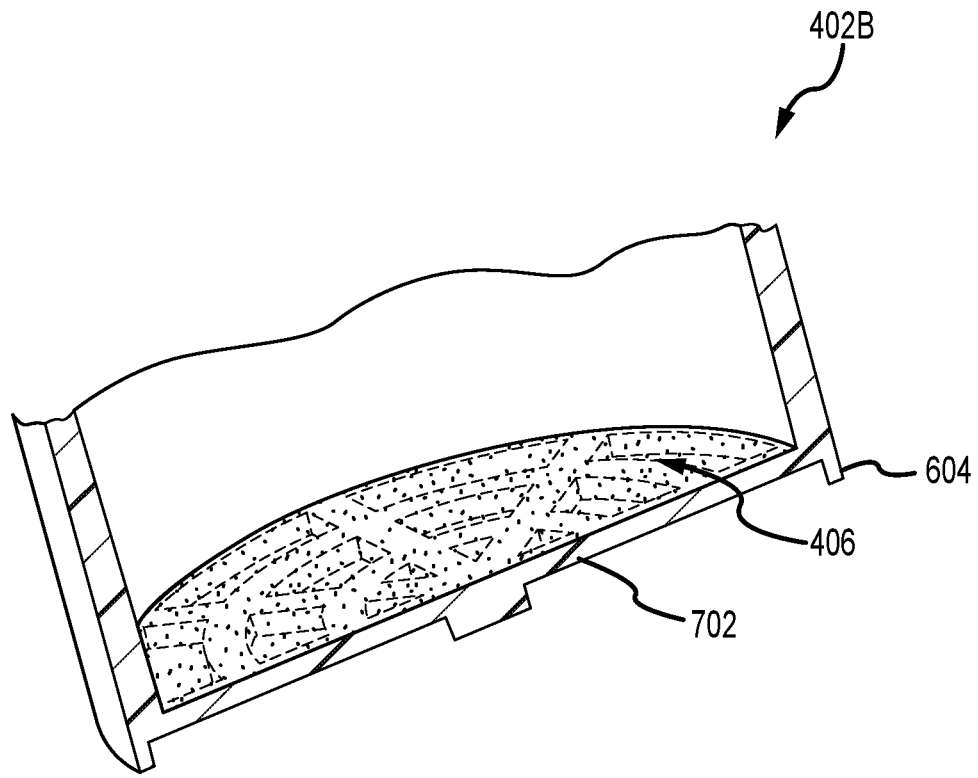
FIG. 7B is a diagram of the bottom of a filter cup and an integrated paper filter after integration according to an embodiment.

FIG. 7B is a diagram of the bottom of a filter cup 402B and an integrated paper filter 406 after integration according to an embodiment. Filter cup 402, after the molding process, includes the gridded floor 702, the integrated paper filter 406, and the deformable flange 404 with integrated o-rings 602 as one unified body.

Figure 8:
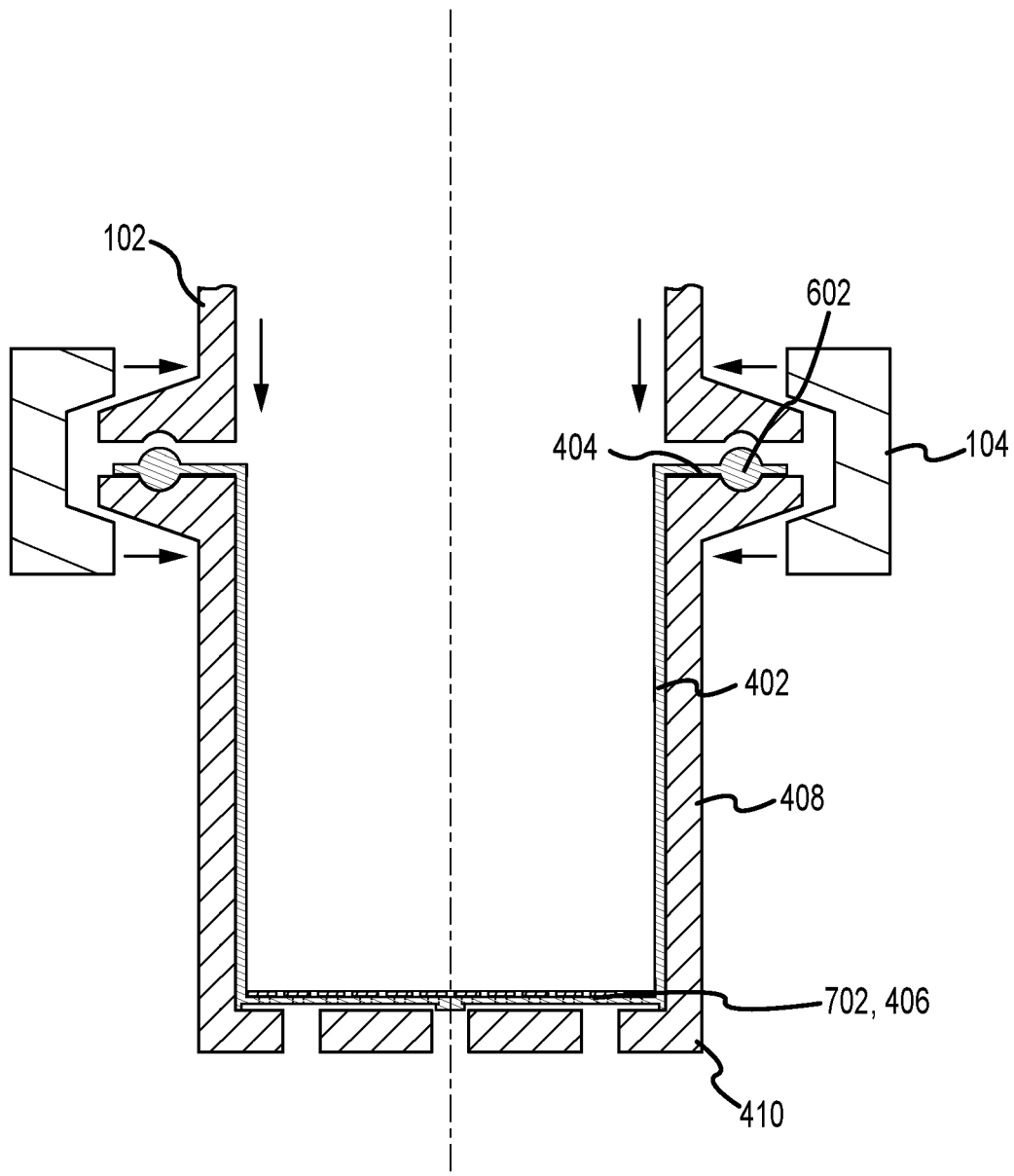
FIG. 8 is a cross section view of a filter cup within a spool according to an embodiment.

FIG. 8 is a cross section view of a filter cup 402 within a spool 408 according to the embodiment of FIG. 4. A reducer 102 can be seen, as well as tri-clamp 104, deformable flange 404, perforated bottom of spool 410, and integrated o-rings 602. Gridded floor 702 is shown combined with integrated paper filter 406.

Figure 9:
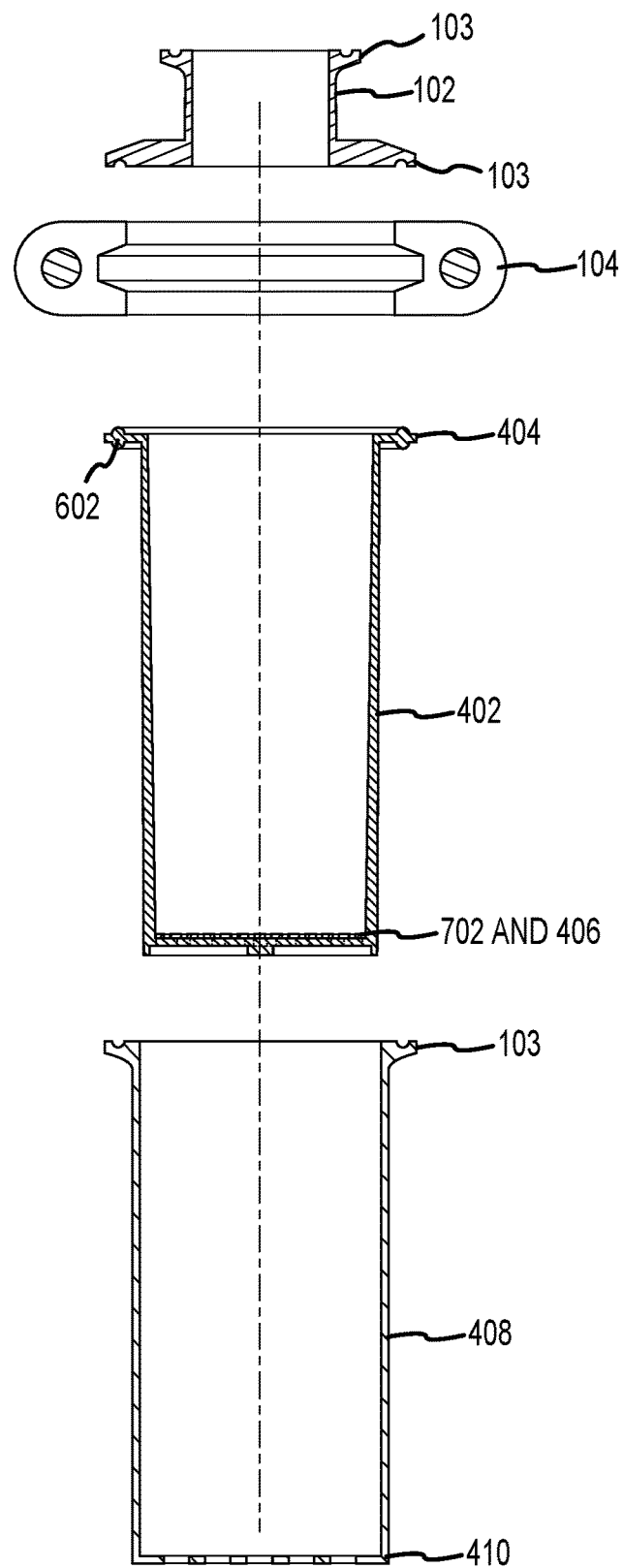
FIG. 9 shows cross-section views of system components according to the embodiment of FIG. 4.

FIG. 9 shows cross-section views of system components according to the embodiment of FIG. 4 and with reference to FIG. 8. FIG. 9 is an alternate view of FIG. 4.

In cross section, a reducer 102 is shown at the top of the figure. The flow of material is from top to bottom in the figure. Tri-clamp 104 functions as previously described. Filter cup 402 is shown before insertion into spool 408. Filter cup 402 includes deformable flange 404 with integrated o-rings 602. The bottom of filter cup 402 includes integrated paper filter 406 and gridded floor 702.

Spool 408 includes a tri-clamp flange 103 and a perforated bottom 410 as described with reference to FIGS. 4 and 8.

Embodiments of the present invention are hereafter described in detail with reference to the accompanying figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

What is claimed is:

1. A system for further filtering a liquid extract material after an initial extraction process, the system comprising:
   a semi-rigid filter cup that is substantially cylindrical, the filter cup having a top and a bottom, wherein the top is oriented to receive filter media prior to a filtration process, and material to be filtered during the filtration process such that a flow of the system is from top to bottom, and wherein the filter cup comprises, an integrated deformable flange at the top of the filter cup;
   an integrated top o-ring that is integrated into the top of the integrated deformable flange;
   an integrated bottom o-ring that is integrated into the bottom of the integrated deformable flange; and
   an integrated filter layer that is integrated into the bottom of the filter cup wherein the bottom of the filter cup is gridded to allow flow of filtered material during the filtration process such that filtered material can flow out of the filter cup and filter media cannot flow out of the filter cup; and
   a spool that is substantially cylindrical, the spool having a top and a bottom and configured to house the filter cup during the filtration process, the spool comprising,
   a top tri-clamp flange at the top of the spool, wherein the top tri-clamp flange is configured to mate with the bottom o-ring of the filter cup; and
   wherein the bottom of the spool includes perforations that permit filtered material from the filter cup to flow out of the bottom of the spool.

2. The system of claim 1, further comprising:
   a top reducer that is configured to mate with the top o-ring of the filter cup; and
   a tri-clamp for retaining the deformable flange between the top reducer and the top tri-clamp flange during the filtration process with sufficient security to withstand pressures of the filtration process.

3. The system of claim 1, wherein the filter cup formed by injection molding and is formed from Poly Propylene.

4. The system of claim 3, wherein the integrated filter layer is integrated into the bottom of the filter cup during injection molding.

5. The system of claim 1 wherein the spool is formed from stainless steel and wherein the top tri-clamp flange and the bottom of the spool are joined by welding to the spool.

6. The system of claim 1, wherein the filter cup further comprises a removeable lid such that the filter cup can be pre-filled with filter media and sealed with the removeable lid.

7. A system for further filtering a liquid extract material after an initial extraction process, the system comprising:
   a semi-rigid filter cup that is substantially cylindrical, the filter cup having a top and a bottom, wherein the top is oriented to receive filter media prior to a filtration process, and material to be filtered during the filtration process such that a flow of the system is from top to bottom, and wherein the filter cup comprises, an integrated deformable flange at the top of the filter cup;
   an integrated top o-ring that is integrated into the top of the integrated deformable flange;
   an integrated bottom o-ring that is integrated into the bottom of the integrated deformable flange; and
   an integrated filter layer that is integrated into the bottom of the filter cup wherein the bottom of the filter cup is gridded to allow flow of filtered material during the filtration process such that filtered material can flow out of the filter cup and filter media cannot flow out of the filter cup; and
   a spool that is substantially cylindrical, the spool having a top and a bottom and configured to house the filter cup during the filtration process, the spool comprising,
   a top tri-clamp flange at the top of the spool, wherein the top tri-clamp flange is configured to mate with the bottom o-ring of the filter cup;
   wherein the bottom of the spool includes perforations that permit filtered material from the filter cup to flow out of the bottom of the spool;
   a bottom tri-clamp flange at the bottom of the spool, wherein the tri-clamp flange is configured to mate with any other component that is lower in the floe of the system.

8. The system of claim 7, further comprising:
   a top reducer that is configured to mate with the top o-ring of the filter cup; and
   a tri-clamp for retaining the deformable flange between the top reducer and the top tri-clamp flange during the filtration process with sufficient security to withstand pressures of the filtration process.

9. The system of claim 7, wherein the filter cup formed by injection molding and is formed from Poly Propylene.

10. The system of claim 9, wherein the integrated filter layer is integrated into the bottom of the filter cup during injection molding.

11. The system of claim 7 wherein the spool is formed from stainless steel and wherein the top tri-clamp flange, the bottom of the spool, and the bottom tri-clamp flange are joined by welding to the spool.

12. The system of claim 7, wherein the filter cup further comprises a removeable lid such that the filter cup can be pre-filled with filter media and sealed with the removeable lid.

* * * * *